Figure 1:
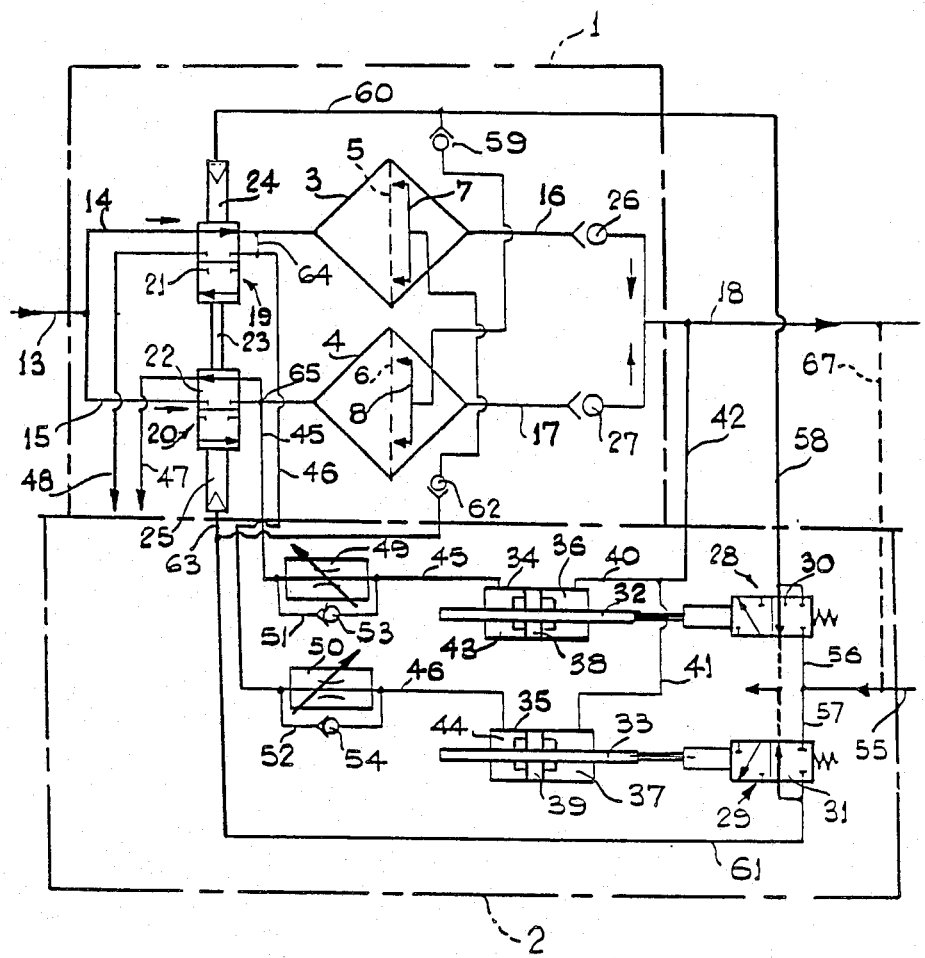

United States Patent [19]

Radmall

[11] Patent Number: 4,636,306
[45] Date of Patent: Jan. 13, 1987

[54] FLUID FILTERING SYSTEMS

[75] Inventor: Paul Radmall, Stonehouse, England

[73] Assignee: Dowty Mining Equipment Limited, Tewkesbury, England

[21] Appl. No.: 758,473

[22] Filed: Jul. 23, 1985

[30] Foreign Application Priority Data

Jul. 27, 1984 [GB] United Kingdom ................ 8419271
Jun. 1, 1985 [GB] United Kingdom ................ 8513862

[51] Int. Cl.$^4$ ............................................. B01D 27/12
[52] U.S. Cl. .................................... 210/108; 210/138; 210/333.1
[58] Field of Search ........... 210/106, 108, 138, 333.01, 210/333.1, 411, 425, 427

[56] References Cited

U.S. PATENT DOCUMENTS 3,485,369 12/1969 Voorhies ............................ 210/138

FOREIGN PATENT DOCUMENTS 1247272 8/1967 Fed. Rep. of Germany .
486324 6/1938 United Kingdom .
703880 2/1954 United Kingdom .
1083144 9/1967 United Kingdom .
1102150 2/1968 United Kingdom .
1328675 8/1973 United Kingdom .
2066688A 7/1981 United Kingdom .

*Primary Examiner*—Frank Sever
*Attorney, Agent, or Firm*—Hayes, Davis & Soloway

[57] ABSTRACT

A fluid filtering system including two filter units so arranged in parallel that flow of fluid from a source to a point of usage can take place by way of only one unit at a time. Means is provided which can sense the degree of contamination of whichever one of the units is in service so that when the degree of contamination is such that the said one unit is no longer in a suitable condition for further filtering service, that means causes the by-passing of that unit and the bringing of the other unit into service. The system further includes back-flushing means which is automatically operable upon a filter unit when so by-passed for cleaning that unit. Timing means is also provided for automatically controlling the period of time during which back-flushing operation is permitted to continue.

4 Claims, 4 Drawing Figures

FLUID FILTERING SYSTEMS

This invention relates to fluid filtering systems.

Certain known types of fluid filtering systems have included two filter units arranged in parallel manner so that when one unit is in service the other is out of service, enabling the latter to be cleaned and/or repaired and/or otherwise maintained, and vice versa. Such cleaning when a filter unit is out of service has been effected by back-flushing of the filter element by a high pressure fluid.

This back-flushing has for example been achieved by means of a rotary member carrying reaction nozzles through which high pressure fluid is discharged to effect rotation of the rotary member and, simultaneously, high pressure fluid is directed by the rotary member through the element in the direction opposite to that of normal filtering flow. In this way foreign matter adhering to the filtering surface of the element is washed off therefrom and caused to pass out from the filter unit. On completion of back-flushing the now-clean filter unit is in readiness to be brought back into service as and when the other filter unit reaches a sufficiently heavily contaminated condition to make this necessary, so that continuous filtration by the system can proceed substantially unhindered.

It is the object of this invention to provide an improved fluid filtration system.

According to this invention a fluid filtering system includes at least two filter units so arranged in parallel that flow of fluid from a source to a point of usage can take place by way of only one said filter unit at a time, the other filter unit or units then being out of service, and means which is capable of sensing the degree of contamination of whichever one of said filter units is in service so that when the degree of contamination is such that the said one filter unit is no longer in a suitable condition for further filtering service, said means causes the by-passing of that filter unit and the bringing of the other filter unit, or one of the other filter units, into service, said system further including back-flushing means which is automatically operable upon a filter unit when so by-passed for cleaning that unit, and timing means for automatically controlling the period of time during which the back-flushing operation is permitted to continue.

Preferably the filter units each have a filter element which is of cylindrical form.

Preferably also the back-flushing means comprises a rotary member disposed at least partly within each said filter element and mounted for rotation with respect thereto, said rotary member carrying ejection means through which high pressure fluid is discharged to effect rotation of said rotary member, and said rotary member having further ejection means through which high pressure fluid is also discharged and directed through the porous cylindrical wall of the respective cylindrical filter element to effect cleaning thereof by back-flushing in the direction opposite to the direction of normal filtering flow therethrough.

The timing means may include a dash-pot device having associated fluid flow restrictor devices and being operably connected to flow control valves for controlling the supply of high pressure fluid to said rotary members.

The flow control valves may also control the operation of valve means disposed on the inlet side of said filter units, said valve means comprising valve elements, one for the flow path into each filter unit, which are so interconnected that when one said flow path is opened by its said valve element the or each other flow path is closed by its said valve element. When a said valve element closes a said flow path into a said filter unit, it preferably also places a said dash-pot device in communication with exhaust by way of the said fluid flow restrictor device associated therewith.

Where two of said filter units are provided, each having a filter element which is of cylindrical form, they may be mounted upon and on either side of a common casing with their longitudinal axes coincident or substantially so and with their interiors opening into said casing, a dash-pot device being housed in said casing, being disposed with its longitudinal axis coincident with said longitudinal axes, or substantially so, and being so connected to a rotary member which forms a said back-flushing means of each of said filter elements that on movement of the displaceable element of said dash-pot device the back-flushing means of one unit traverses longitudinally within that unit in the direction outwardly of said casing, and, simultaneously the back-flushing means of the other unit traverses longitudinally within that unit in the direction inwardly of said casing, and vice versa. In this way flow of back-flushing fluid through one of the filter units can be caused to occur for a predetermined period of time to cleanse that filter unit while the other filter unit is normally operative in in-line service.

Here each back-flushing means may include a hollow spool-like element which is rotatable about said longitudinal axis and within the respective filter element. In this case each said spool-like element includes reaction nozzles, through which fluid is discharged to the exterior of that element to cause that element to rotate, and further includes cleansing nozzles through which fluid is also discharged to the exterior of that element for back-flushing of the respective filter element during traverse of the respective back-flushing means by said dash-pot device.

The advantages offered by the invention are mainly that when one filter unit becomes contaminated to an undesirable extent, that unit is automatically taken out of service and is subjected to a cleaning process for a predetermined time in readiness for automatic placing-back in service, thereby providing for continuous in-line filtration.

Figure 2:
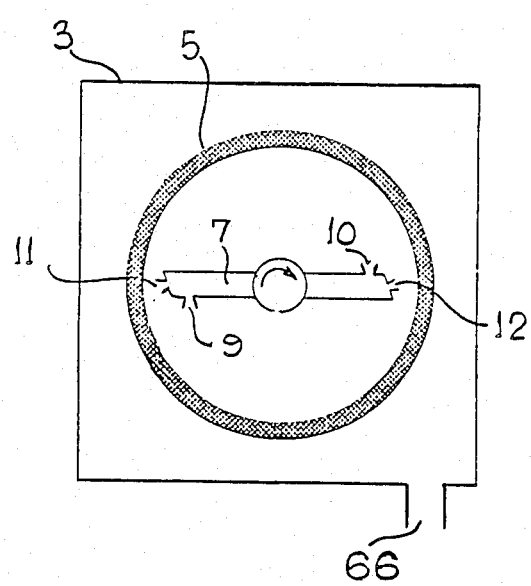
Figure 3:
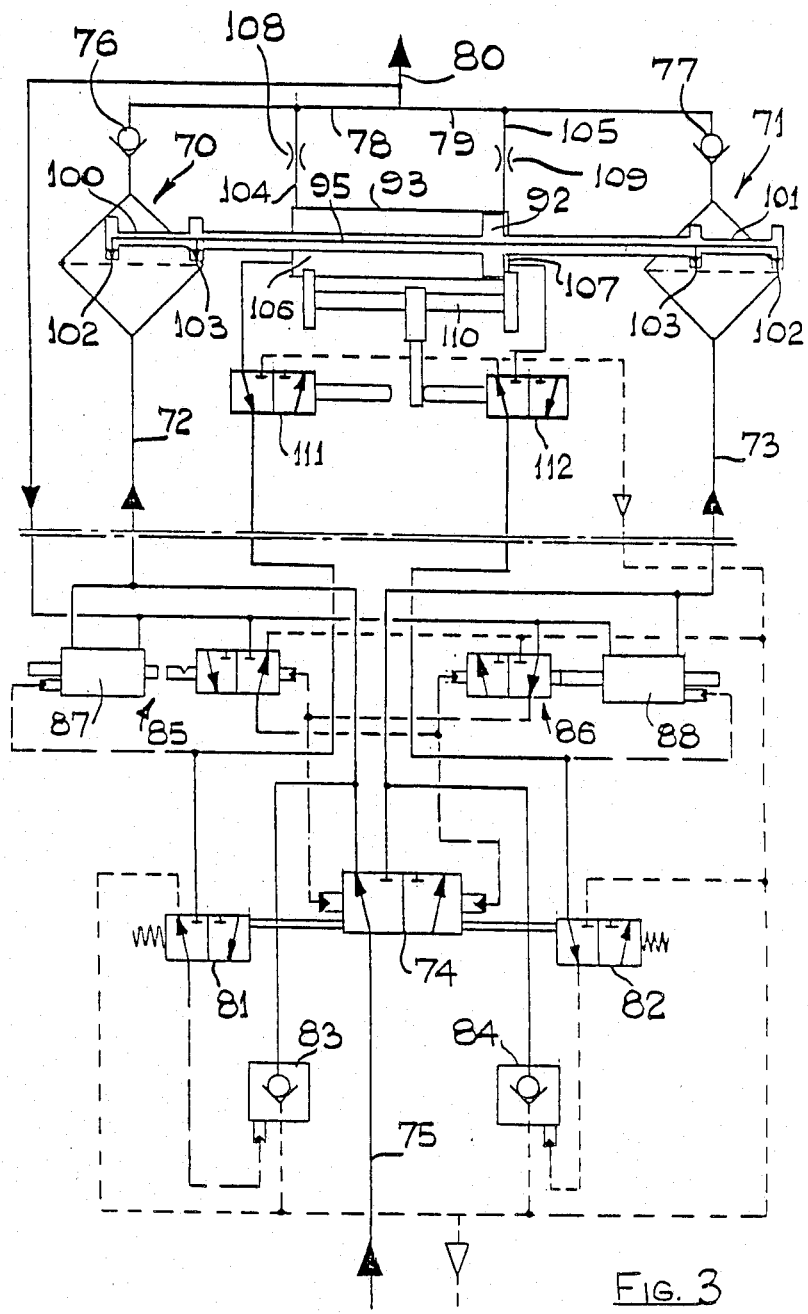
Figure 4:
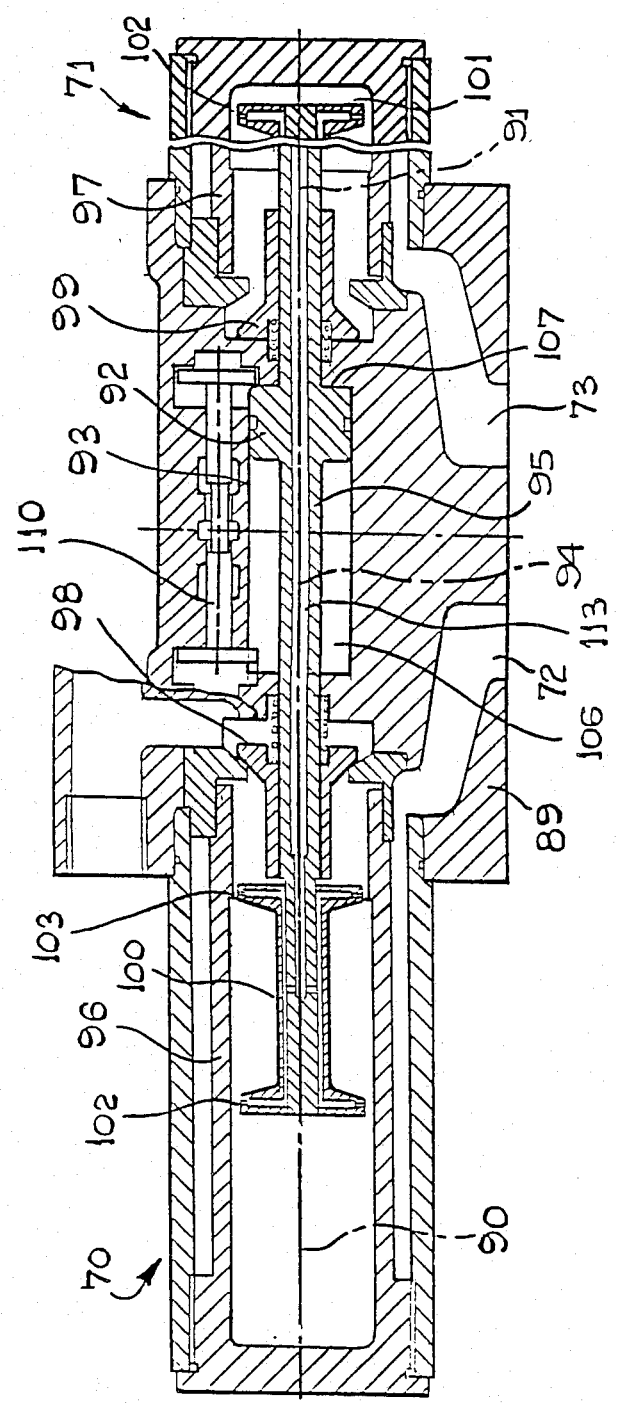

Two ways of carrying out the invention are described in detail below with reference to the accompanying drawings which illustrate two specific embodiments, in which FIG. 1 is a diagrammatic representation of a fluid filtering system in accordance with the first embodiment which includes two parallel filter units, FIG. 2 is a cross-section of one of the two filter units shown in FIG. 1, FIG. 3 is a diagrammatic representation of a fluid filtering system in accordance with the second embodiment which includes two filter units, and FIG. 4 is a cross-sectional elevation of a practical construction of the two filter units of FIG. 3 mounted upon a common casing.

With reference to FIGS. 1 and 2 of the drawings a fluid filtering system, which is suitable for use with liquid-pressure-operable mine roof supports and other liquid-pressure-operable equipment used in mines, comprises a filter and change-over section 1 and a timing section 2. The section 1 includes two filter units 3, 4, the porous elements 5, 6 of which are of cylindrical form. A rotary member 7, 8 is disposed within each element 5, 6 and extends for the length thereof. Ejection means in the form of reaction nozzles 9, 10 are provided on the rotary member through which liquid under high pressure can be discharged to effect rotation of the rotary member with respect to element 5, 6. Each rotary member is provided with further ejection means in the form of a series of nozzles, two of which are shown at 11, 12, through which liquid under high pressure is also discharged and directed throughout the length of the porous cylindrical wall of the respective element 5, 6 to effect cleaning thereof by back-flushing in the direction opposite to the direction of normal filtering flow therethrough. Thus as viewed in FIG. 2 filtering flow takes place in the direction radially-inwardly of element 5, 6 and back-flushing takes place in the direction radially-outwardly thereof.

An inlet conduit 13 to section 1, for unfiltered liquid under pressure from a suitable source (not shown) branches into two passages 14, 15 which are respectively taken to filter units 3, 4. Discharge passages 16, 17 respectively taken from units 3, 4 combine into a common outlet conduit 18 suitably taken to fluid-pressure-operable mining apparatus (not shown) to be operated by the filtered pressure liquid.

A two-position slide valve 19 is provided in passage 14 and a two-position slide valve 20 is provided in passage 15. The movable elements 21, 22 of these valves are coupled together by a rod 23 so as to be movable as one and have detent means (not shown) to hold them in each of their two positions. A liquid-pressure-operable operator means 24, 25 is provided for each element 21, 22.

Downstream of filter units 3, 4 passages 16, 17 are each provided with a non-return valve 26, 27 permitting flow of liquid only in the direction away from the filter units.

The timing section 2 includes two flow control valves 28, 29 of the two-position type. The movable elements 30, 31 of these valves are respectively connected to the piston rods 32, 33 of two piston-and-cylinder type dash-pot devices 34, 35. The chambers 36, 37 to the right of the pistons 38, 39 of the devices 34, 35 are connected together through passages 40, 41 and are connected through common passage 42 to outlet conduit 18. The chambers 43, 44 to the left of pistons 38, 39 are respectively connected, by way of passages 45, 46 which lead to valves 20, 19 and hence by way of passages 47, 48 taken from those valves, to reservoir (not shown). Passages 45, 46 each include a variable restrictor 49, 50. A by-pass passage 51, 52 provided across each of these restrictors includes a non-return valve 53, 54 which permits flow of liquid by-passing its restrictor only in the direction towards the respective dash-pot device 34, 35.

The timing section 2 has an inlet conduit 55 connected to a source independent from the source associated with inlet conduit 13. Clean liquid, to be used for back-flushing of elements 5, 6, is supplied through conduit 55. This conduit branches into two passages 56, 57 which are respectively taken to valves 28, 29. A passage 58 is taken from valve 28 to rotor 8 of filter unit 4 and includes a non-return valve 59 which permits flow of liquid only in the direction towards rotor 8. A passage 60 is branched from passage 58 at a point upstream from valve 59 and is taken to operator means 24. A passage 61 is taken from valve 29 to rotor 7 of filter unit 3 and includes a non-return valve 62 which permits flow of liquid only in the direction towards rotor 7. A passage 63 is branched from passage 61 at a point upstream from valve 62 and is taken to operator means 25.

A short passage 64 places passage 14 at a point downstream from valve 19 in communication with passage 46, and passage 15 is interconnected at a point 65 downstream from valve 20 with passage 45 as shown.

In operation of the fluid filtering system above described, and assuming elements 21, 22 of valves 19, 20 are positioned as shown in FIG. 1 so that filter unit 3 is in service and filter unit 4 is out of service, flow of unfiltered pressure liquid through inlet conduit 13 passes through passage 14 and, with reference to FIG. 2, passes radially-inwardly through filter element 5 to the interior thereof. Filtered liquid then passes outwardly of filter unit 3 and through valve 26 and outlet conduit 18 to apparatus (not shown) to be operated thereby. Simultaneously pressure liquid from passage 14 passes by way of passages 64, 46, restrictor 50, passage 52 and thus opened valve 54 to chamber 44 of dash-pot device 35, while pressure liquid from outlet conduit 18 passes by way of passages 42 and 41 to chamber 37 of dash-pot device 35. In this way valve 29 is held in the position shown. At the same time, since chamber 36 of dash-pot device 34 is in communication with the liquid pressure in conduit 18 and chamber 43 thereof is open to reservoir through passage 45, valve 20 and passage 47, piston 38 and rod 32 are displaced to the left and valve 28 is also held in the position shown.

Provided the filter element 5 does not become unduly clogged by foreign matter it is permitted to remain in in-line service. When however clogging of the element 5 becomes excessive so that in that condition it is no longer providing acceptable filtration of the pressure liquid supplied to section 1, it is brought out of service automatically. This takes place because as a result of the pressure drop now occurring across filter element 5 due to its clogged condition, the pressure in conduit 18 and thus in chambers 36, 37 falls. Since a high pressure subsists in chamber 44, piston 39 and rod 33 of device 35 move to the right in FIG. 1 against the spring loading of valve 29 so that element 31 of that valve is also moved to the right. Thus clean liquid, which is the same as the filtered liquid and supplied under pressure to conduit 55, passes through passage 57, open valve 29, passage 61 and passage 63 to operator means 25, whereupon valves 19, 20 are lifted away from their positions shown in FIG. 1. As a result valve 19 closes off flow of liquid through passage 14 to filter unit 3 and places passage 46 in communication with passage 48 and reservoir. Simultaneously valve 20 opens passage 15 to filter unit 4 and closes off passage 45 from passage 47 and thus from reservoir. Pressure liquid from passage 15 now gains access by way of passage 45 and passage 51 to chamber 43 of dash-pot device 34.

At the same time clean pressure liquid present in passage 61 passes through valve 62 to rotor 7 and is discharged through reaction nozzles 9, 10 causing the rotor to rotate within the cylindrical filter element 5. This clean liquid is also discharged through nozzles 11, 12 so that it back-flushes filter element 5, flowing radially-outwardly of the element, that is in the direction opposite to filtering flow therethrough. Thus foreign matter clogging the element 5 and adhering to the cylindrical outer surface thereof is washed off that surface and falls to the base of unit 3, being flushed therefrom through the opening 66 to atmosphere.

As soon as valve 19 has opened passage 46 to passage 48, flow of liquid takes place from chamber 44 of device 35 through passage 46, restrictor 50 and passage 48 to reservoir. The rate of such flow is determined by the setting of restrictor 50, and hence the speed of movement of piston 39 and piston rod 33 to the left as chamber 44 exhausts is dependent on that setting. Thus back-flushing of filter element 5 continues for as long as it takes for chamber 44 to so exhaust, whereupon valve 29 is closed and supply of clean liquid from conduit 55 into passage 61 and thus to rotor 7 ceases. The filter element 5 of unit 3 has now been back-flushed sufficiently for it to remain on stand-by in readiness for further in-line service when the other filter unit 4 requires to be by-passed for cleaning.

Since valves 19, 20 are provided with detent means, those valves are held in their uppermost positions in FIG. 1 until the pressure drop across filter unit 4 due to ultimate clogging of the element 6 thereof increases such that the lowering of pressure in chamber 36 permits the pressure, now maintained by way of passage 45 and passage 51, in chamber 43 to displace element 30 of valve 28 to the right in FIG. 1 against its spring loading. Hence clean liquid in conduit 55 is able to pass into passage 58 and passage 60 and thus to operator means 24 to displace elements 21, 22 of valves 19, 20 to their lowered positions by which the filter unit 3 is automatically brought back into in-line service and the filter unit 4 is now by-passed. At the same time clean liquid in passage 58 passes through valve 59 to rotor 8 to effect rotation of that rotor within filter element 6 and consequent back-flushing of that element for the period determined by the time it takes for liquid to exhaust from chamber 43 of device 34 to reservoir by way of restrictor 49, passage 45, valve 20 and passage 47. Following such back-flushing, element 6 is in readiness for in-line service when subsequently required.

By the above arrangement the dash-pot devices 34, 35 are sensitive to the pressure drops across their filter units and are operable for automatic control of filter unit change-over irrespective of the absolute pressures subsisting in the associated circuits. In other embodiments of the invention the means for sensing such pressure drops may be electro-hydraulic, electrical or electronic.

Although in the embodiment above described with reference to FIGS. 1 and 2 the cleaning liquid is derived from a source separate from the in-line flow being filtered, in alternative embodiments of the invention the liquid used for cleaning may be derived from the filtered side of the in-line system and may be suitably raised in pressure as necessary in for example line 67.

Further, although in the embodiment above described with reference to FIGS. 1 and 2 the cleaning fluid is a liquid, in alternative embodiments of the invention it may be a gas, for example compressed air.

With reference now to FIGS. 3 and 4 a liquid filtering system, which is again suitable for continuous use with liquid-pressure-operable mine roof supports and other liquid-pressure-operable equipment used in mines, includes two filter units 70, 71 arranged in parallel manner in respective flow lines 72, 73. A two-position selector valve 74 is capable of conducting liquid requiring filtration present in inlet flow line 75 into either the flow line 72 or the flow line 73 so that one or other of the filter units 70, 71 is brought into operation. Discharge from units 70, 71 takes place through respective non-return valve 76, 77 and thence through line 78, 79 to outlet flow line 80 from where the filtered liquid passes to a service (not shown) required to use that liquid.

Two selector trip valves 81, 82 are associated with valve 74 and with respective dump valves 83, 84. A pressure sensor and trigger valve 85, 86 is provided in association with each filter unit 70, 71. The sensor section 87, 88 is responsive to the existing pressure differential across the respective filter unit, and when this exceeds a predetermined value the respective valve 85, 86 is caused to operate, this in turn effecting appropriate operation of selector valve 74.

The two filter units 70, 71 are, as shown in FIG. 4, mounted on a common casing 89 with their longitudinal axes 90, 91 coincident and their interiors opening into the interior of the casing.

A timer in the form of a dash-pot device, comprising a piston 92 movable in cylinder 93 formed in casing 89, is arranged with its longitudinal axis 94 coincident with those of units 70, 71. The piston rod 95 of the dash-pot device extends from both sides of the piston 92 into the interiors of the cylindrical filter elements 96, 97 of the respective filter units 70, 71.

The displaceable elements 98, 99 of non-return valves 76, 77 are mounted on piston rod 95 and are spring-loaded on to their seatings.

At each end portion piston rod 95 carries back-flushing means in the form of respective spool 100, 101 which is rotatable about axis 90, 91 as a result of thrust developed by liquid discharged from the interior of the spool through reaction nozzles as at 102. Each spool also includes cleansing nozzles, as at 103, through which liquid can be discharged from the interior thereof. This liquid is capable of passing back through the wall of the respective filter element 96, 97 washing away particles of contaminant adhering to the cylindrical exterior surface of the element.

As shown in FIG. 3 passageways 104, 105 are respectively connected between lines 78, 79 and the chambers 106, 107 on each side of piston 92. Each passageway 104, 105 is provided with a respective flow-restrictor 108, 109. The piston 92 is so cooperable at each end of its stroke with flanged bar 110 as to operate either timer trip valve 111 or timer trip valve 112 as the case may be, these valves being associated with respective selector trip valves 81, 82 and respective dump valves 83, 84.

During operation of the filtering system with for example selector valve 74 in the position shown and thus filter unit 70 operative to filter liquid passing through inlet line 75 to outlet line 80, should element 96 of that unit 70 become contaminated more than a predetermined amount the resultant pressure differential across the element, which is sensed by sensor section 87, will cause trigger valve 85 to move to the right in FIG. 3 resulting in change-over of selector valve 74.

Flow from inlet line 75 to outlet line 80 will now take place through filter unit 71, and unit 70 will be isolated from line 75.

Clean liquid passing out from unit 71 will gain access through restrictor 109 and passageway 105 to chamber 107. Since timer trip valve 112 is closed and timer trip valve 111 is open, the piston 92 and rod 95 of the dash-pot device will move to the left causing the spools longitudinally to traverse within the cylindrical filter elements 96, 97. As will be understood from FIG. 4, this traverse occurs due to the pressure differential subsisting between the unit 71 which is in service and the unit 70 which is out of service, that is the assembly of piston 92, rod 95, spool 100 and spool 101, is subjected at the right-hand portion thereof in FIG. 4 to the high pressure liquid passing through unit 71 which is in in-line service, while that assembly is subjected at the left-hand portion thereof in FIG. 4 to the low pressure condition in the unit 70 which is now out of service and which is being back-flushed. Thus during this back-flushing operation the pressure differential across the assembly causes the assembly to move from right to left, as viewed in FIG. 4, for the length of stroke of piston 92. Clean liquid will enter the interior of spool 101 through its nozzles 102, 103 and pass through duct 113 in rod 95 to the interior of spool 100 and out through nozzles 102, 103 of that spool causing rotation of the spool and cleansing filter element 96 as it passes therethrough, during traverse of the spool, in the radial outward direction, i.e. opposite to normal filtering flow. Liquid with contaminant particles is discharged through dump valve 83.

Having now been subjected to a cleansing operation for a period of time dependent on the stroke and velocity of piston 92, filter unit 70 is now in readiness for bringing back into in-line service. This will occur automatically when filter unit 71 becomes sufficiently blocked as, through pressure sensor and trigger valve 86, to cause selector valve 74 to move back to the right so that liquid in inlet line 75 is redirected through unit 70.

The system now operates in converse manner to effect cleaning of the filter element 97 of unit 71.

Thus the system is automatic and continuous in its operation.

Although in the embodiment above described with reference to the drawings the fluid being filtered is a liquid, in alternative embodiments of the invention the fluid being filtered may be a gas.

Again, although in the embodiments above described with reference to the drawings the fluid used for back-flushing is the same as the filtered fluid, in other embodiments of the invention the fluid used for back-flushing may be different from the filtered fluid, for example it may be a suitable proprietary solvent.

Further, although in the embodiments above described with reference to the drawings each fluid filtering system includes only two filters, in alternative embodiments of the invention a suitable number of filter units in excess of two may instead be provided, but only one of these would be in in-line service at any one time.

Finally, although in the embodiments above described with reference to the drawings each fluid filtering system is used for filtering liquid employed in fluid-pressure-operable mining equipment, it may in other embodiments be used in other applications, for example in aircraft systems or in industrial systems where continuous and efficient filtering of fluid is essential for satisfactory operation of fluid-pressure-operable equipment thereof.

I claim:

1. A fluid filtering system including at least two filter units so arranged in parallel that flow of fluid from a source to a point of usage can take place by way of only one said filter unit at a time, each other filter unit then being out of service, said system also including means for sensing the degree of contamination of whichever one of said filter units is in service so that when the degree of contamination is such that the said one filter unit is no longer in a suitable condition for further filtering service, said means including means for causing the by-passing of that filter unit and the bringing of another filter unit into service, said system further including jet-type back-flushing means which is automatically operable upon its filter unit when so by-passed to effect cleaning of the filter element of that unit, by jet back-flushing in the direction opposite to normal filtering flow therethrough, said back-flushing means being so subjected to the pressure differential subsisting between the unit in service and the unit out of service as to cause that back-flushing means to traverse with respect to its said filter element, and timing means for automatically controlling the period of time during which the jet back-flushing operation is permitted to continue.

2. A system as claimed in claim 1, wherein two of said filter units are provided, each having a filter element which is of cylindrical form, and are mounted upon and on either side of a common casing with their longitudinal axes coincident or substantially so and with their interiors opening into said casing, a dash-pot device being housed in said casing, being disposed with its longitudinal axis coincident with said longitudinal axes, or substantially so, and being so connected to a rotary member of said jet-type back-flushing means of each filter elements that on movement of the displaceable element of said dash-pot device, under said pressure differential the jet-type back-flushing means of one unit traverses longitudinally within that unit in the direction outwardly of said casing, and, simultaneously the jet-type back-flushing means of the other unit traverses longitudinally within that unit in the direction inwardly of said casing, and vice versa.

3. A system as claimed in claim 2, wherein each jet type back-flushing means includes a hollow spool-like element which is rotatable about said longitudinal axis and within the respective filter element.

4. A system as claimed in claim 3, wherein each said spool-like element includes reaction nozzles, through which fluid is discharged to the exterior of that element to cause that element to rotate, and further includes cleansing nozzles through which fluid is also discharged to the exterior of that element for jet back-flushing of the respective filter element during traverse of the respective jet-type back-flushing means by said dash-pot device.

* * * * *